Figure 1:
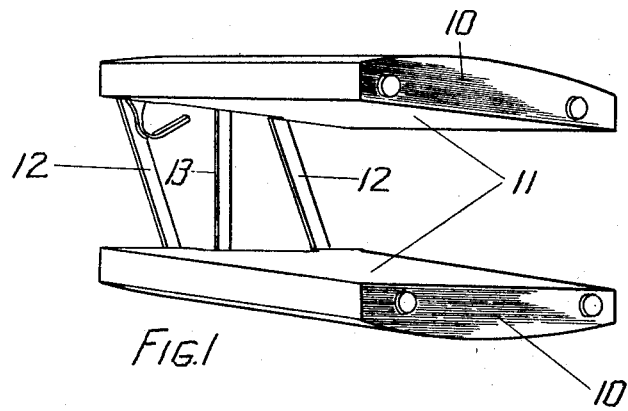

P. M. STEGMAIER.
CALIPERS FOR ROPE AND THE LIKE.
APPLICATION FILED MAY 7, 1913.

1,105,217.

Patented July 28, 1914.

WITNESSES

INVENTOR
Philip M. Stegmaier
BY Mitchell, Chadwick & Kent
ATTY'S

UNITED STATES PATENT OFFICE.

PHILIP M. STEGMAIER, OF PLYMOUTH, MASSACHUSETTS, ASSIGNOR TO PLYMOUTH CORDAGE COMPANY, OF PLYMOUTH, MASSACHUSETTS, A CORPORATION OF MASSACHUSETTS.

CALIPERS FOR ROPE AND THE LIKE.

1,105,217.  Specification of Letters Patent.  Patented July 28, 1914.

Application filed May 7, 1913. Serial No. 766,021.

*To all whom it may concern:*

Be it known that I, PHILIP M. STEGMAIER, a citizen of the United States, residing at Plymouth, in the county of Plymouth and State of Massachusetts, have invented new and useful Improvements in Calipers for Rope and the like, of which the following is a specification.

This invention relates to improvements in calipers.

More particularly, it relates to calipers for measuring diameter of rope.

Hitherto it has been customary to get the size of rope by the use of calipers similar to those used by machinists, carpenters and others, the instrument having a couple of blunt points adjustable to different distances from each other, the distance between them being the diameter of the body measured. The inappropriateness of an instrument of this sort for measuring the diameter of rope is obvious, owing to the flexibility and uneven surface of rope and the spherical or bi-curved nature of the crests, so that the true tip of a crest is hard to determine, and the fact that opposite crests are not truly opposite to each other, but, so far as I am aware, no better instrument for calipering rope has been known until the present invention.

It is the object of the present invention to provide simple apparatus by which the diameter can be measured more exactly and easily. The invention accomplishes this by providing calipers that automatically select the true crests on each side of the rope, and project the levels of those crests to positions opposite each other where they can be conveniently measured. More specifically, the instrument has blocks with two parallel plane surfaces of size and relation to each other suitable to embrace the rope that is to be calipered, and to touch two or more adjacent crests on one side and at least one crest on the other side of the rope. These three points, two in one plane and one in the other and parallel plane, determine the positions of the planes at a distance apart from each other which is the true diameter of the rope and which may then easily be measured, by measuring the distance between the planes at any convenient place. The blocks supporting these planes may be connected together by any means that allows the distance between them to be easily varied without their departing from parallelism. The form at present preferred is that of simple parallel links, having long bearings through the blocks, parallel to each other and to said planes. A scale may be added, pivoted on one of the blocks and adapted to lie parallel with the planes when the apparatus is closed, and perpendicular to them when ready for use. Devices may be added to cause this scale to assume its position automatically and correctly when the calipers are closed or opened; and this scale may be graduated to show both the diameter and the circumference of the rope at a glance.

Figure 2:
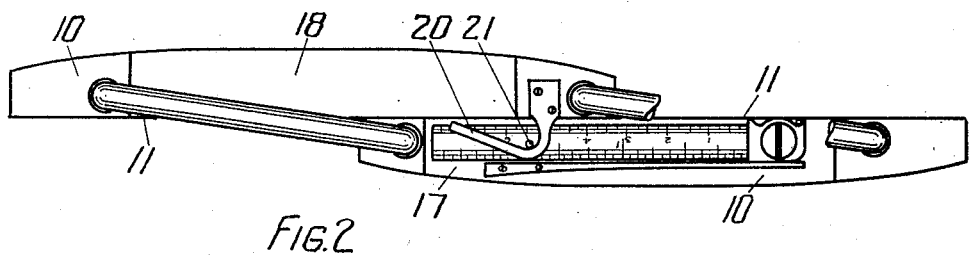
Figure 3:
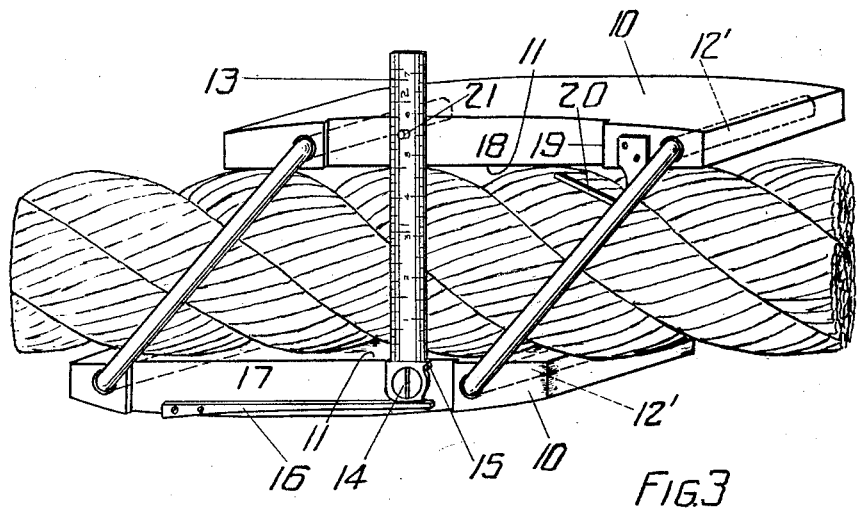

In the accompanying drawings, which illustrate an embodiment of the invention, Figure 1 is a perspective viewed with the eye on a level between two planes; Fig. 2 is an elevation showing the calipers closed as when not in use; and Fig. 3 is a perspective showing the calipers in use.

In the drawings, 10, 10 represent blocks of wood or metal having plane surfaces 11, 11, which face each other and are maintained always parallel to each other by the connecting parts of the calipers. The specific connection illustrated consists of links 12, 12, which are duplicates of each other. Each has a part which runs through one of the blocks for a suitable distance in a journal or bearing 12', arranged parallel to the adjacent plane 11 and parallel to the other bearing 12'; a similar part in a similar bearing in the other block; and the connecting link portion, connecting these two journaled portions. The journaled portions of one link are the same distance apart as the similar portions of the other link; and the journals are the same distance apart in one of the blocks 10 is in the other block 10; so that a parallelogram is formed. The journals are long, and the links are sufficiently strong or stiff so that no looseness originally existing, or which may be developed by wear, is sufficient to allow any appreciable variation of the adjacent planes 11 from parallelism with each other; and so that the parts of the links resting in the journals 12' cannot by any ordinary force be bent out of parallelism with each other. By this means the planes which constitute the operating surfaces of the calipers are hinged at their edges, as it were, and are retained permanently in parallelism. If a piece of rope be then laid anywhere between these planes, and the two blocks be pressed together upon it, the planes will automatically select the extreme points on each side of the rope for their bearing. This is because the plane on one side, having come to a bearing on two or more crests, and being thus alined in parallelism with that side of the rope, does not touch any part of a strand on that side that is nearer the axis of the rope. The plane bearing on the other side of the rope being parallel with the first plane cannot touch anything but the single point that is most remote from the first plane, or all of the points that are equally most remote therefrom, all of which are likewise crests. It is assumed of course, that the rope being measured has first been drawn straight; but if not straight that fact will be evident to a person sighting between the planes, and the rope can be made straight by pressing the blocks together, provided the planes are long enough to engage several crests on each side of the rope. Therefore, preferably the planes are made long enough to cover several crests of the rope strands, but it is sufficient if they be only long enough to engage two crests of one side and one of the other, and this is particularly important in the case of rope of large diameter. The planes 11 should be wide enough to reach transversely past the center of the largest rope that is to be measured by the instrument, enough for the user to see clearly that the planes thus project beyond the crest.

The calipers illustrated further comprise a measuring scale 13 from which the diameter or circumference of the rope can be read directly, and automatic means to control this scale. The scale is pivoted at 14 on one of the blocks, and is adapted to swing on said pivot between a position of parallelism with and perpendicularity to said planes 11, shown respectively in Figs. 2 and 3. A stop 15 is provided, which is carefully located with respect to the position of the pivot 14 and the edge of the scale which abuts against it, so that when this scale is in engagement with this stop its edge is perpendicular to the planes 11. The scale then has its zero graduation precisely at the level of the surface 11 on the block 10 to which it is pivoted, and consequently the distance marks thereon show directly the diameter of the rope that is being measured; inasmuch as the other plane projects in parallelism from the opposite side of the rope directly to the edge of this scale.

The scale is preferably of such width that it can be housed or protected by lying flat along the edge of the block 10. The block may carry a spring 16 adapted to engage either the side or the end edge of the butt end portion of the scale, to hold the scale either housed or opened. This returns the scale against the stop 15, if it be accidentally moved away while the calipers are in use, thus making the instrument self correcting. To this purpose, the butt end of the scale is not strictly rectangular but is slightly oblique, as illustrated, so that the tendency of the spring is always to press the scale against the stop 15, thus insuring its perpendicularity to the two planes. This scale may be arranged either on the same side of the apparatus where the links are, as illustrated, or may be on the opposite side; and the edges of the blocks 10 may have superficial recesses, 17, 18, adapted to receive the scale. The recess 17, on the block 10 to which the scale is pivoted, affords a sort of housing for it. The bottom of the recess 18, on the other block 10, affords a parallel positioned surface over which the end of the scale may travel; and the shoulder or abutment 19 at one end of the recess 18 is in position to engage the end of the scale and swing it into closed position automatically when the two blocks 10 are swung together into the position of Fig. 2.

The graduations on the scale may be in linear measure according to the actual distance of the planes 11 apart, to show diameter of the rope, or may be marked with the proper multiple thereof to show circumference of the rope. The accuracy of the measurement can be easily tested, first, by sighting through and observing how the rope lies between the planes 11, and whether all crests are touching; and second, by other readings, taken in order to strike an average, by rotating the rope on its own axis while it is in position and observing the readings at the different stages of rotation. This gives a quick ocular, and an easily measurable, indication as to whether the diameter originally read is the average diameter and to what extent the diameter varies in the same part of the rope. Fig. 3, while professing to be a perspective, has been distorted somewhat to illustrate this visual characteristic, in that the top of the rope, which really should be seen in the middle back ground, i. e., touching the upper plane about midway between its front and rear edges, and so somewhat hidden by the front portion of the upper block, has been represented as if in proximity to the front edge of the upper plane 11, as it would be seen if the eye were at the level of the upper plane 11, although the remainder of the figure is perspective.

To use the calipers, a person swings the blocks apart on their links 12 until the scale automatically assumes a position of perpendicularity, lays the rope between them, and then continues the swing of the blocks on their links until the rope is engaged between the planes 11. A catch 20 may be fixed on the other block 10, its edge being near the shoulder 19 of recess 18, the catch projecting in position to engage around a pin 21 fixed in suitable position on the scale 13. When the calipers are closed, from the position of Fig. 3 toward that of Fig. 2, this catch first assumes a position with its hook under the pin, and then, as the rotation of the scale 13 from perpendicularity into parallelism with block 10 progresses, this catch and pin become engaged together. When the calipers are next opened, the catch 21 operates to draw the scale 13 out of its position of parallelism; and, before it lets go, it moves the scale far enough toward its position of perpendicularity for the spring 16 to take hold of it and to finish the movement of opening the scale. Thus the calipers adjust the scale automatically on closing, to a position of safety and protection, and on opening to the correct position for use; and the calipers themselves are automatic, when in use, in finding the proper points on the rope whose distance should be measured for getting the diameter of the rope, and in projecting that distance to a place where a scale can be applied, and in indicating visibly the variations of the rope in diameter at any given place, when the rope is rotated *in situ*. Coupled with these advantages in use, it is to be noted that the calipers can be manufactured at small expense with sufficient accuracy for ordinary uses. The plane surfaces 11 having been formed, the bearings can be drilled parallel thereto. The links may be each a piece of heavy wire, subjected to a single operation of forming with a die so that long portions at each end are bent into precise parallelism to each other, with the incidental result that the die-formed center portions of the links are of identical length. The ends may then be inserted in the bearings, and the terminals headed over as rivets.

I claim as my invention:

1. Rope calipers comprising two plane faced blocks combined with linkage joining the edges of said blocks and maintaining said plane faces toward and parallel to each other, said plane faces being adapted to bear upon opposite sides of a length of rope, one plane face engaging a plurality of crests on one side of the rope and the other plane face engaging a crest on the other side, whereby the diameter of rope whose crests are not diametrically opposite is indicated by the distance between the plane faces.

2. Rope calipers comprising two blocks having plane surfaces facing each other and adapted to bear upon opposite sides of a length of rope, one plane face engaging a plurality of crests on one side of the rope and the other plane face engaging a crest on the other side, whereby the diameter of rope whose crests are not diametrically opposite is indicated by the distance between the plane faces, and said blocks being provided with long bearings extending parallel to each other through the blocks; combined with links, parallel to each other, and each having integral portions comprising pivots in said bearings.

3. Rope calipers comprising two blocks having plane surfaces facing each other and adapted to bear upon opposite sides of a length of rope, combined with links holding the plane surfaces parallel to each other while movable to and from each other, a scale mounted on one block and movable between parallelism with and perpendicularity to said plane surfaces, and means on the other block to engage and set it when the blocks are moved.

Signed by me at Boston, Mass., this thirtieth day of April, 1913.

PHILIP M. STEGMAIER.

Witnesses:
EVERETT E. KENT,
ANNA B. LINDSAY.